(12) United States Patent
Moore et al.

(10) Patent No.: US 11,993,223 B2
(45) Date of Patent: May 28, 2024

(54) VEHICLE SEAT CONNECTOR ASSEMBLY

(71) Applicant: CTS Corporation, Lisle, IL (US)

(72) Inventors: Douglas C. Moore, Chicago, IL (US); Gregory Bunin, Lake Zurich, IL (US); Xiaofeng Huang, Chicago, IL (US)

(73) Assignee: CTS Corporation, Lisle, IL (US)

( * ) Notice: Subject to any disclaimer, the term of this patent is extended or adjusted under 35 U.S.C. 154(b) by 144 days.

(21) Appl. No.: 17/821,671

(22) Filed: Aug. 23, 2022

(65) Prior Publication Data

US 2023/0065653 A1 Mar. 2, 2023

Related U.S. Application Data

(60) Provisional application No. 63/236,506, filed on Aug. 24, 2021.

(51) Int. Cl.
| | |
|---|---|
| *B60R 22/26* | (2006.01) |
| *B60R 22/195* | (2006.01) |
| *B60R 22/48* | (2006.01) |
| *B60R 22/18* | (2006.01) |

(52) U.S. Cl.
CPC .......... *B60R 22/26* (2013.01); *B60R 22/1952* (2013.01); *B60R 22/48* (2013.01); *B60R 2022/1806* (2013.01); *B60R 2022/4816* (2013.01); *B60R 2022/485* (2013.01)

(58) Field of Classification Search
CPC ..... B60R 22/26; B60R 22/1952; B60R 22/47; B60R 2022/1806; B60R 2022/4816; B60R 2022/485
See application file for complete search history.

(56) References Cited

U.S. PATENT DOCUMENTS

| | | | | |
|---|---|---|---|---|
| 3,995,268 A | * | 11/1976 | Ferrari .................... | B60R 22/48 331/47 |
| 5,947,543 A | * | 9/1999 | Hubbard .............. | B60N 2/4221 296/68.1 |

(Continued)

FOREIGN PATENT DOCUMENTS

| | | |
|---|---|---|
| WO | 2013096927 A1 | 6/2013 |
| WO | 2017036935 A1 | 3/2017 |

OTHER PUBLICATIONS

International Search Report and Written Opinion for Application No. PCT/US2022/075323 dated Dec. 16, 2022 (11 pages).

*Primary Examiner* — Philip F Gabler
(74) *Attorney, Agent, or Firm* — Michael Best & Friedrich LLP

(57) ABSTRACT

A vehicle seat connector assembly comprising a first connector coupled to the seat of the vehicle and including a first inductive coil. A second connector is coupled to the vehicle and includes a second inductive coil. The first and second connectors are positioned relative to each other into a first relationship with the first and second connectors coupled to each other and the first and second inductive coils positioned opposite each other to define a closed inductive coil circuit and a second relationship with the first and second connectors and the first and second inductive coils separated from each other to define an open inductive coil circuit. A third inductive coil is located on the vehicle seat belt buckle and a coil cable extends between the first inductive coil of the first connector and the third inductive coil.

20 Claims, 4 Drawing Sheets

(56) References Cited

U.S. PATENT DOCUMENTS

| | | | |
|---|---|---|---|
| 7,560,827 B2* | 7/2009 | Jacas-Miret | B60R 21/01 |
| | | | 307/9.1 |
| 9,126,514 B2* | 9/2015 | Soar | H02J 50/10 |
| 9,415,748 B2* | 8/2016 | Sugawara | B60R 22/48 |
| 9,555,769 B2* | 1/2017 | Lanter | B60R 22/48 |
| 9,912,174 B2* | 3/2018 | Soar | H04B 5/26 |
| 2004/0140890 A1* | 7/2004 | Hartmann | B60R 22/48 |
| | | | 340/505 |
| 2007/0096891 A1* | 5/2007 | Sheriff | B60R 22/48 |
| | | | 297/464 |
| 2007/0102999 A1* | 5/2007 | Darraba | G01D 5/204 |
| | | | 307/10.1 |
| 2009/0146789 A1* | 6/2009 | Holbein | B60R 22/48 |
| | | | 340/10.1 |
| 2010/0007805 A1 | 1/2010 | Vitito | |
| 2011/0018498 A1* | 1/2011 | Soar | H01F 27/36 |
| | | | 320/108 |
| 2018/0219334 A1* | 8/2018 | Kahlman | G06F 13/4063 |

\* cited by examiner

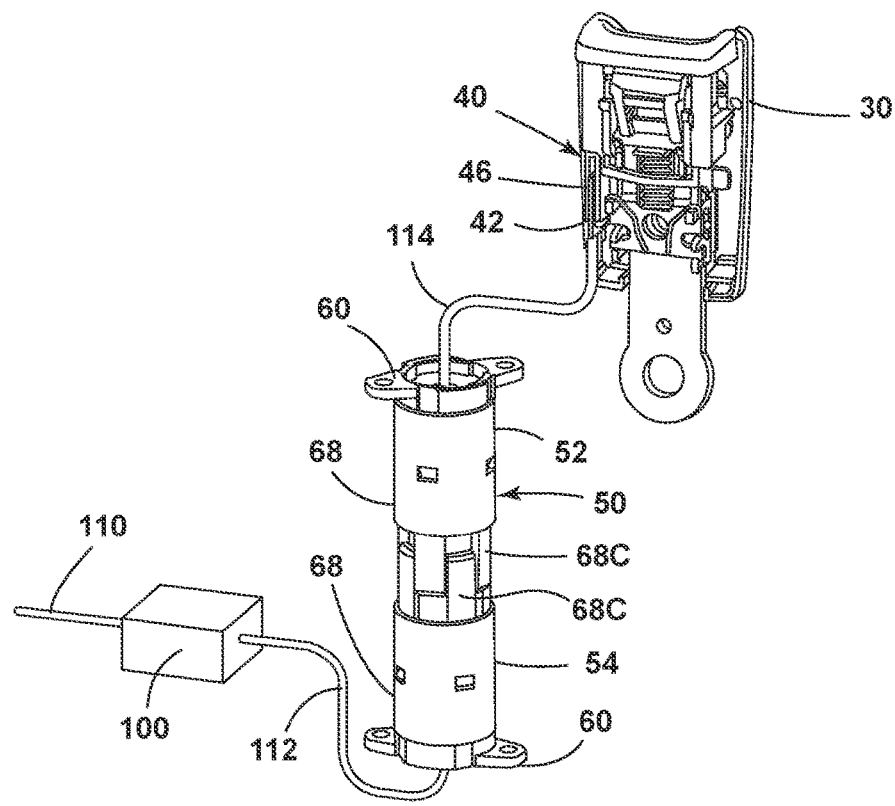
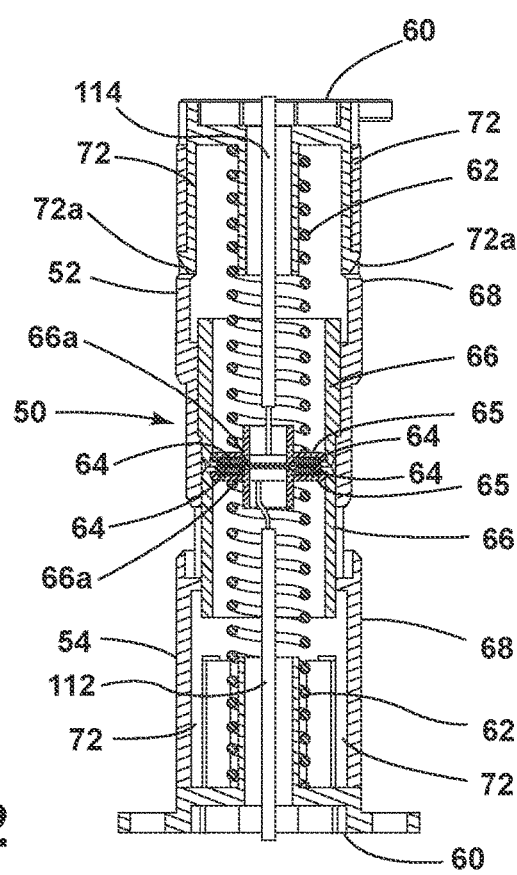
FIG. 1
FIG. 2

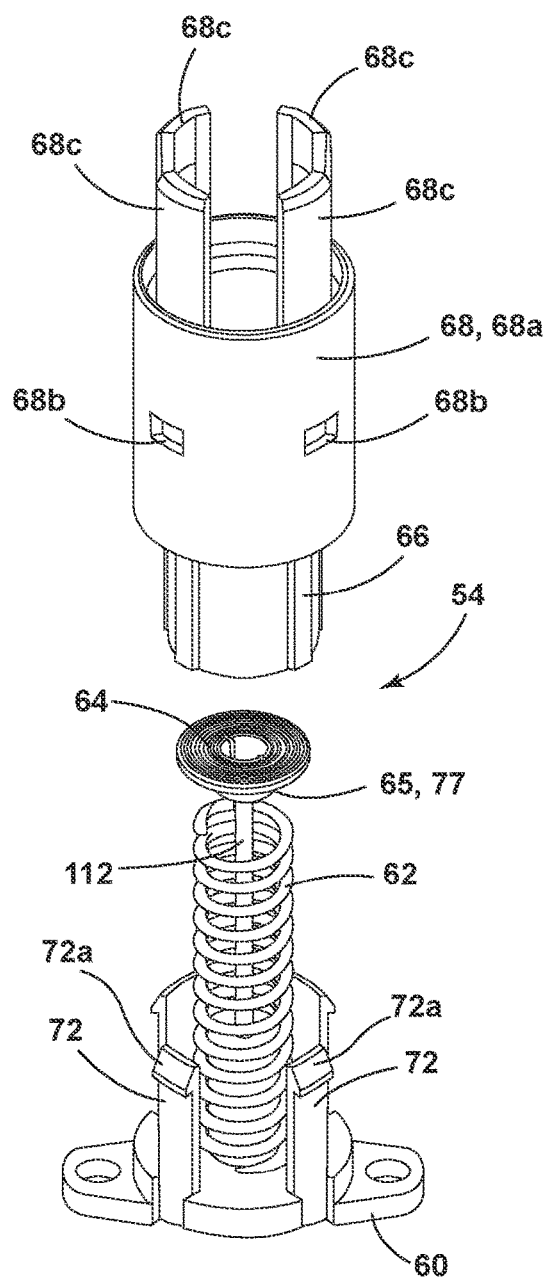
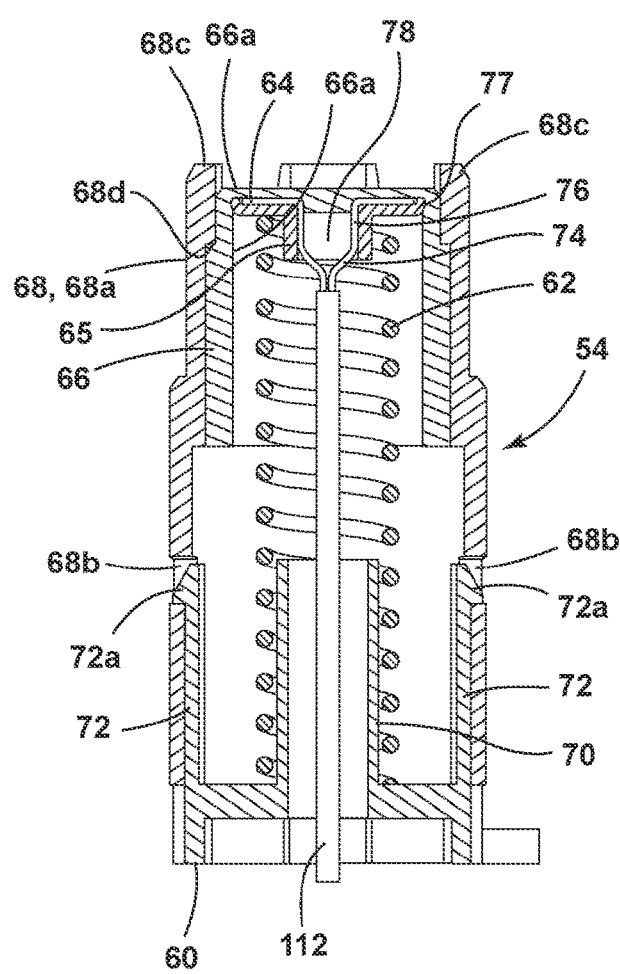
FIG. 3
FIG. 4

VEHICLE SEAT CONNECTOR ASSEMBLY

RELATED APPLICATIONS

This application claims priority from U.S. Provisional application 63/236,506 filed Aug. 24, 2021, the disclosure of which is hereby incorporated by reference herein.

FIELD

This invention relates to a vehicle seat connector assembly and, more specifically, to an inductive/passive connector assembly for a vehicle seat and vehicle seat belt buckle.

BACKGROUND

Currently available vehicle seats and associated seat belt buckles include wired sensor assemblies for monitoring and detecting the removal of the vehicle seats and the latching and unlatching of the seat belt buckle.

The present invention is directed to a vehicle seat and vehicle seat belt buckle connector assembly that can monitor and detect the removal of the vehicle seat and the latching and unlatching of the seat belt buckle using a wireless inductive/passive sensor.

SUMMARY

The present invention is generally directed to a vehicle seat connector assembly comprising a first connector coupled to the seat of the vehicle and including a first inductive coil, and a second connector coupled to the vehicle and including a second inductive coil, the first and second connectors being positioned relative to each other in a first relationship with the first and second connectors coupled to each other and the first and second inductive coils positioned opposite each other to define a closed inductive coil circuit and a second relationship with the first and second connectors and the first and second inductive coils separated from each other to define an open inductive coil circuit.

In one embodiment, the vehicle seat connector assembly further comprises a third inductive coil on a vehicle seat belt buckle, and a cable extending between the first inductive coil of the first connector and the third inductive coil.

In one embodiment, the vehicle seat connector assembly further comprises a shield on the vehicle seat belt buckle, the third inductive coil and the shield being movable relative to each other into a relationship wherein the shield covers or is retracted from the third inductive coil.

In one embodiment, the vehicle seat connector assembly further comprises a vehicle seat/belt buckle monitor module and another cable extending between the vehicle seat/belt buckle monitor module and the second inductive coil of the second connector.

In one embodiment, each of the first and second connectors includes a housing defining an interior for a foot, a coil spring, a pusher, and the first and second inductive coils respectively.

In one embodiment, the respective first and second inductive coils are seated against the pusher, the coil spring exerts a compressive force against the first inductive coil, the foot is secured to the housing, and the cable extends through the foot.

In one embodiment, the foot includes a plurality of clips for securing the foot to the housing.

In one embodiment, each of the first and second inductive coils includes respective ends wound on respective first and second coil bases.

BRIEF DESCRIPTION OF THE DRAWINGS

These and other features of the invention can best be understood by the description of the accompanying FIGS. as follows:

FIG. 1 is a perspective view of a vehicle seat connector assembly in accordance with the present invention;

FIG. 2 is a vertical cross-sectional view of the connector of the vehicle seat connector assembly shown in FIG. 1;

FIG. 3 is an exploded perspective view of one of the connector halves or sections of the connector;

FIG. 4 is a vertical cross-sectional view of the one of the connector halves or sections of the connector;

DESCRIPTION

Figure 5:
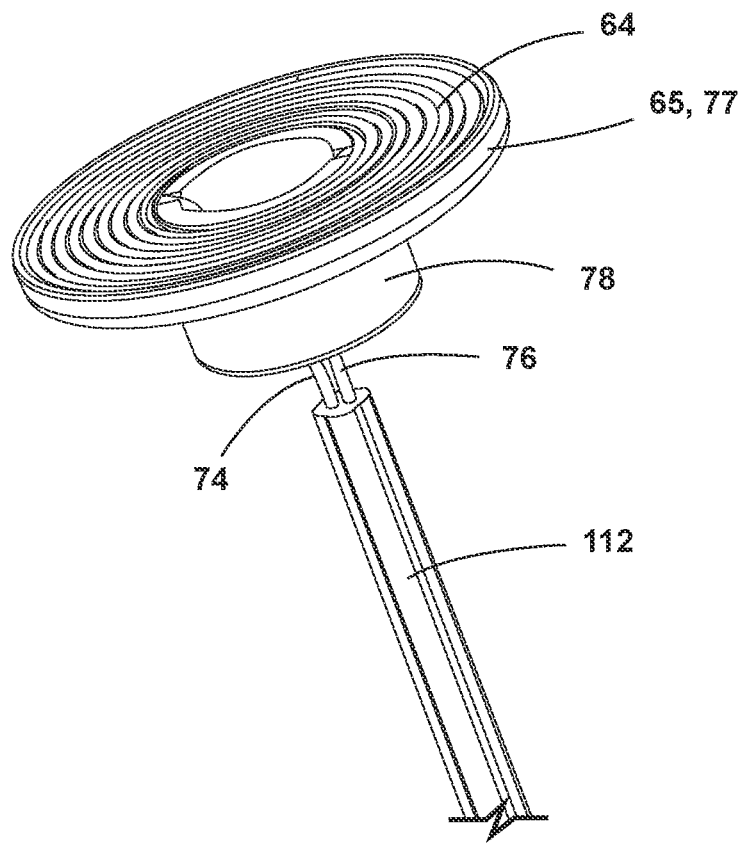
FIG. 5 is broken perspective view of the inductive coil assembly of each of the connector halves or sections of the connector.
Figure 6:
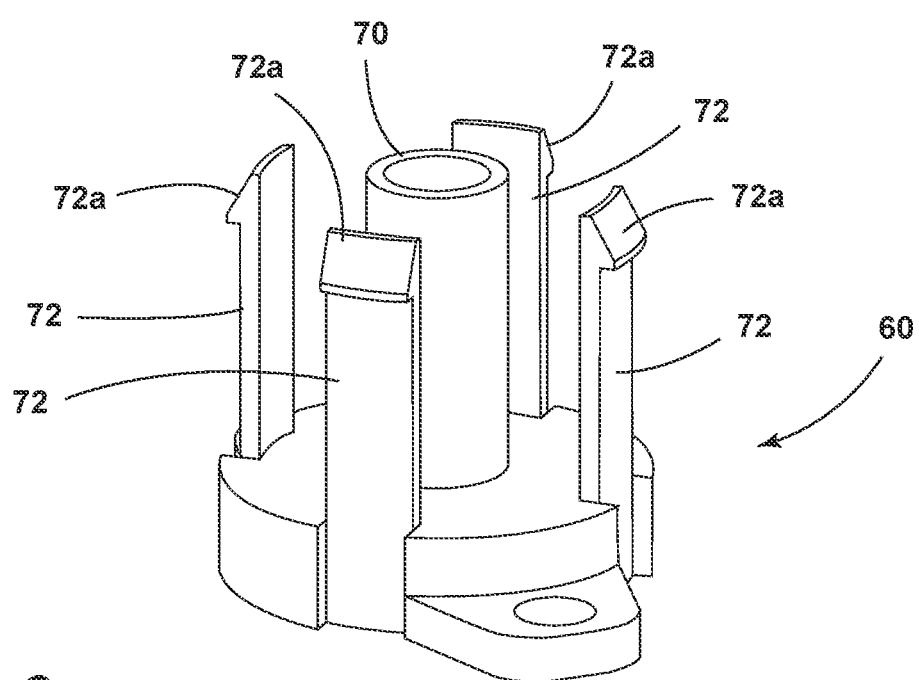
FIG. 6 is a perspective view of the foot of each of the connector halves or sections of the connector.
Figure 7:
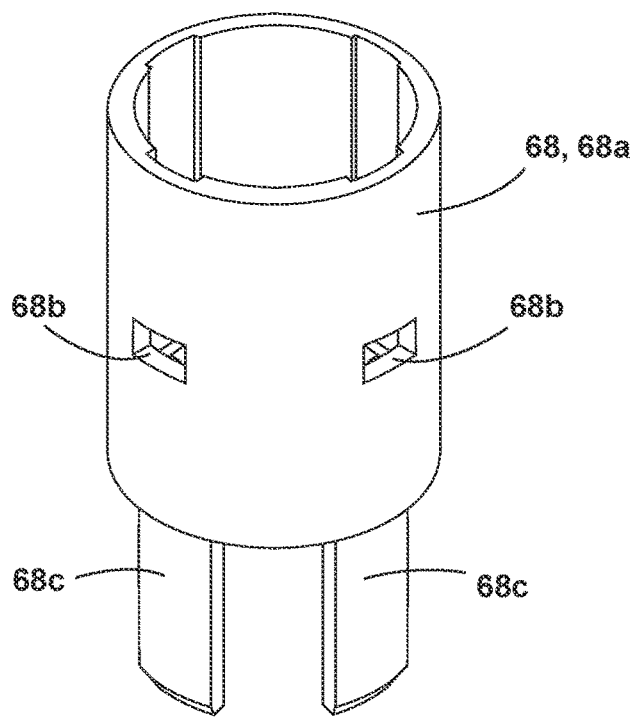
FIG. 7 is a perspective view of the exterior housing of each of the connector halves or sections of the connector.
Figure 8:
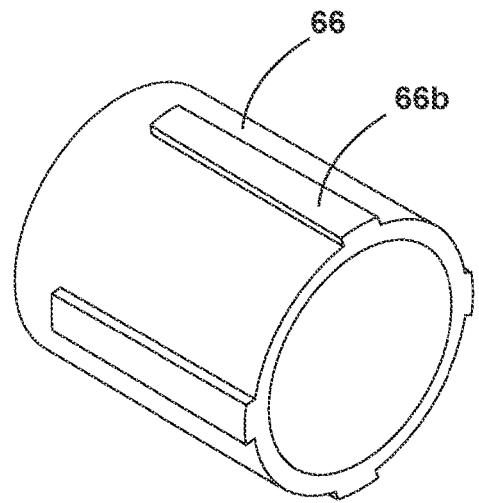
FIG. 8 is a perspective view of the pusher of each of the connector halves or sections of the connector.

FIG. 1 is a perspective view of an inductive/passive vehicle seat and vehicle seat connector assembly that includes a vehicle seat belt buckle connector assembly 20 that comprises a printed circuit board (PCB) coil and screen/shield assembly 40 mounted on a vehicle seat belt buckle 30, an inductive/passive connector or transformer 50, and a vehicle seat belt buckle monitor module 100.

A first coil cable 110 extends between one end of the vehicle seat belt buckle monitor module 100 and one end of the vehicle electronic control unit (ECU) (not shown). A second coil cable 112 extends between an opposed end of the vehicle seat belt buckle monitor module 100 and a first end of the inductive/passive connector 50. A third coil cable 114 extends between an opposed end of the inductive/passive connector 50 and the PCB/printed circuit coil and screen/shield assembly 40 on the vehicle seat belt buckle 30.

The inductive/passive connector or transformer 50 includes a first connector or transformer half or section 52 and a second connector or transformer half or section 54. In one embodiment, and although not shown or described in any detail, it is understood that the first connector 52 is secured or mounted to a vehicle seat and the second connector 54 is secured is installed or mounted to the floor of the vehicle.

Although not shown or described in any detail, it is also understood that the vehicle seat belt buckle 30 is adapted to be secured or mounted to the vehicle seat with the first connector 52 secured or mounted thereto. The vehicle seat is a portable or removable seat in one arrangement.

FIG. 2 depicts the interrelationship between the elements of the respective connector sections 52 and 54 in their coupled and closed inductive connector circuit relationship. FIGS. 3-8 depicts the elements of the connector section 54. It is understood however that the connector section 52, as shown in FIG. 2, includes elements that are identical in structure and function to the elements of the connector section 54 and thus the description below in regard to the elements of the connector section 54 applies equally to the elements of the connector section 52.

The connector section 54 includes a foot 60, an elongate coil spring 62, an inductive coil 64, a magnetic pole piece/inductive coil base/seat 65 which seats and receives and supports the inductive coil 64, and a pusher 66 all located in the interior of a generally cylindrically shaped and hollow housing 68. In the embodiment shown, the foot 60, the pusher 66, and the housing 68 are made of nylon and the coil spring 62 is made of metal.

The foot 60 includes a central elongate post 70 and plurality of elongate flexible clip arms 72 including distal clips 72a and extending in a relationship surrounding and spaced and parallel to the central post 70.

The magnetic pole piece or coil base/seat 65 includes a bowl 77 and a central hollow collar 78 in open communication with the interior of the bowl 77. The distal ends of respective coil wires 74 and 76 extend through the collar 78 and are wound and seated on the interior surface of the bowl 77 in a circular and abutting relationship as shown in FIG. 5 so as to define the wound inductive coil 64 seated in the coil base/seat 65. In the embodiment shown, the magnetic pole piece or coil base/seat 65 is made of a plastic material filled with magnetic powder. In another arrangement, the inductive coil 64 is a circular shaped printed circuit coil similar to the arrangement of an inductive coil, such as a printed circuit coil 44 shown in FIG. 9.

The pusher 66 is in the form of an elongate and hollow tube which is closed at one distal end by a radial end wall 66a. In one arrangement, the end wall is closed. The pusher 66 includes ribs 66b along exterior lengths thereof to prevent rotation of the pusher.

The housing 68 includes a circumferential wall 68a which defines the hollow housing interior and opposed open ends in communication with the hollow housing interior. The circumferential wall 68a includes and defines a plurality of through windows 68b extending around the circumference of the circumferential wall 68a in a spaced apart and co-linear relationship. The housing 68 additionally includes a plurality of circumferentially extending and spaced apart elongate legs 68c.

In accordance with the embodiment as shown in FIGS. 3 and 4, the elements of the first connector section 52 are assembled as follows.

Initially, the pusher 66 is inserted through the lower open end of the housing 68 and is extended through the interior of the housing 68 into a relationship in which the pusher 66 is seated on a circumferential ledge 68d defined on the interior circumferential surface of the housing 68.

The cable 112, with the coil 64 seated and wound in the bowl 77 of the magnetic pole piece/inductive coil base/seat 65, is inserted through the lower open end of the housing 68 and is extended therethrough into a relationship with the windings of the coil 64 abutted against the interior surface of the radial end wall 66a of the pusher 66.

The coil spring 62 is then inserted through the lower open end of the housing 68 and is extended through the interior of the housing 68 into a relationship with a lower distal end of the coil spring 62 surrounding the collar 78 of the magnetic pole piece/inductive coil base 65 and abutted against the exterior face of the bowl 77 of the magnetic pole piece/inductive coil base 65.

Thereafter, the foot 60 is inserted through the lower open end of the housing 68 and is extended through the interior of the housing 68 into a relationship with the post 70 extending through the open end of the coil spring 62 and the respective distal clips 72a of the respective clip arms 72 of the foot 60 extending into the respective windows 68b defined in the circumferential wall 68a of the housing 68 for securing the foot 60 to the housing 68.

The insertion and securement of the foot 60 in the housing 68 also results in the compression of the coil spring 62 which in turn results in the exertion of a compressive force by the distal end of the coil spring 62 against the base or bowl 77 of the pole piece/inductive coil base/seat 65 which in turn results in the compression of the base of the pole piece/inductive coil base/seat 65 against the closed radial end wall 66a of the pusher 66 for preventing the movement of the coil 64 in the interior of the housing 68.

Although not shown or described herein in any detail, it is understood that the identical elements of the second connector section 52 are assembled in the same manner as the first connector section 54.

Moreover, and although not shown or describe herein in any detail, it is understood that the first connector section 52 is installed on the vehicle seat and the second connector section 54 is installed on the vehicle floor into a relationship as shown in FIGS. 1 and 2 in which the first connector section 52 is coupled to the second connector section 54 with the respective radial end walls 66a of the respective pushers 66 abutted against each other and, more specifically, with the respective windings of the respective coils 64 in the respective connector sections 52 and 54 positioned directly opposite and spaced from each other to create a closed inductive connector circuit with a corresponding circuit impedance value, phase value, and amplitude value and signal which is sensed by the seat and buckle monitor module 100 to allow for the generation of a visual, audible, or the like signal indicative of the presence of the vehicle seat in the vehicle.

Stated another way, it is understood that the buckle monitor module 100 generates an alternating current (AC) which travels through the cable 112 and more specifically through the coil wires 74 and 76 extending thereto which in turn results in the generation of a magnetic field in the region of the coil 64 wound and seated in the coil base 65 of the connector section 54. This magnetic field is concentrated or amplified by the pole piece/coil base 65 and transferred to the region of the opposed coil 64 seated in the pole piece/coil base 65 of the connector section 52 extending through the opposed connector section 52 thereby creating the closed inductive circuit that results in the wireless transmission of the AC current between the respective cables 112 and 114 in the respective opposed connector sections 54 and 52 in the relationship with the two connector sections 52 and 54 and, more specifically results in the inductive coupling between the respective coils 64 of the respective connector sections 52 and 54.

Further, in the embodiment as shown in FIGS. 1 and 2, the first and second connector sections 52 and 54 are coupled together in a relationship in which the respective elongate legs 68c of the respective housings 68 of the respective first and second connector sections 52 and 54 are interdigitated with each other.

Figure 9:
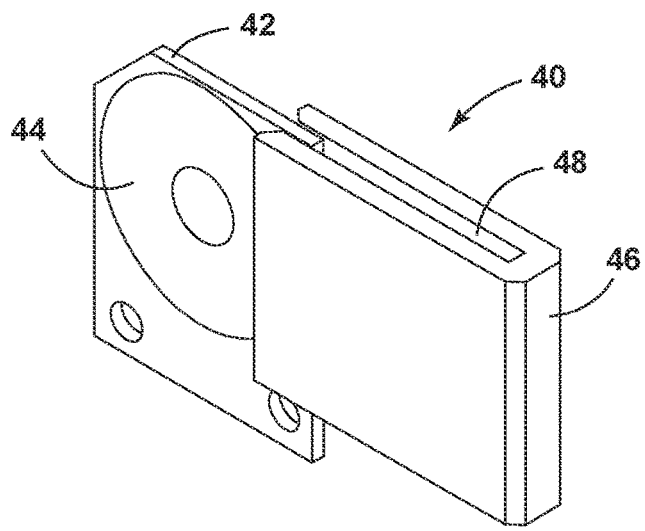
FIG. 9 is a simplified perspective view of the PCB inductive coil and screen/shield of the connector assembly with the screen/shield retracted from the PCB inductive coil.
Figure 10:
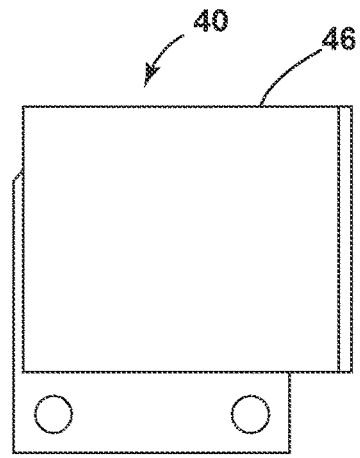
FIG. 10 is a simplified perspective view of the PCB inductive coil and screen/shield of the connector assembly with the screen/shield covering the PCB inductive coil.

Referring to FIGS. 1, 9, and 10, the seat belt buckle 30 may be of any construction as presently known in the art with the exception that it has been modified to incorporate the printed circuit coil 44 and screen/shield assembly 40 in accordance with the present arrangement. In the embodiment shown, the printed circuit coil 44 and screen/shield assembly 40 is comprised of a printed circuit board 42 which has an inductive printed circuit coil 44 formed on one of the exterior faces thereof such as by printing or the like and a screen/shield 46 in the form of a generally U-shaped piece of material such as metal or the like that defines a central open sleeve 48 adapted to receive the printed circuit board 42.

The printed circuit board 42 and the screen/shield 46 are located and mounted on the vehicle seat belt buckle 30 in a relationship in which the printed circuit board 42 and the screen/shield 46 are moveable or slidable relative to each other in response to the buckling or unbuckling of the seat belt buckle 30 and, more specifically, are moveable or slidable relative to each other into a relationship in which the screen/shield 46 either covers or is retracted from the printed circuit board 42 and the inductive printed circuit coil 44 formed thereon in the buckled/unbuckled state or condition of the seat belt buckle 30.

In the present embodiment, FIG. 9 depicts the retracted position of the printed circuit board 42 relative to the shield 46 in the released condition of the vehicle seat belt buckle 30 while FIGS. 1 and 10 depict the covered position of the printed circuit board 42 and the printed circuit coil 44 relative to the shield 46 in the engaged condition of the vehicle seat belt buckle 30.

In accordance with the present arrangement, a change in the position of the printed circuit board 42 and the screen/shield 46 relative to each other in the respective positions with the screen/shield 46 retracted or covering the printed circuit board 42 in response to the buckling or unbuckling of the seat belt buckle 30 results in a change in the open or closed condition of the inductive circuit and, more specifically, a change in the impedance, phase, and amplitude of the inductive connector circuit signals, that is sensed by the seat and buckle monitor module 100 to generate a visual, audible, or the like signal indicative of the buckled or unbuckled status of the vehicle seat belt buckle 30.

Stated another way, the movement of the printed circuit board 42 and the screen/shield 46 relative to each other into the position with the screen/shield 46 covering the printed circuit board 42 results in a concentration or increase or change in the amplitude of the magnetic field generated by the inductive printed circuit coil 44 that is formed on the printed circuit board 42 which results in a change in the impedance, phase, and amplitude of the inductive connector circuit signal transmitted successively through the cable 114, the connector sections 52 and 54, the cable 112 and into the buckle monitor module 100 to allow for the generation of the visual, audible, or the like signal indicative of the buckled or unbuckled status of the vehicle seat belt buckle 30.

Further, in accordance with the present arrangement, and although not shown or described herein in any detail, it is understood that, when a portable or removable vehicle seat is removed from the vehicle, the first and second connector sections 52 and 54 of the connector 50 are separated from each other which results in the separation of the respective coils 64 in the respective connector sections 52 and 54 which results in an open inductive circuit and a corresponding change in the impedance, phase, and amplitude of the inductive connector circuit signals that is sensed by the seat and buckle monitor module 100 to generate a visual, audible, or the like signal indicative of a vehicle seat which has been removed from the vehicle.

Stated another way, it is understood that when the connector sections 52 and 54 are separated from each other, such as for example, when a vehicle seat is removed from a vehicle, the distance between the connector sections 52 and 54 is such that there is no transfer of the magnetic field between respective connector sections 52 and 54 thus resulting in the open inductive circuit in which there is no inductive coupling between the respective coils 64 in the respective connector sections 52 and 54 and there is no transfer of any alternating current (AC) between the respective connector sections 52 and 54. When a vehicle seat is placed in the vehicle, the connector sections 52 and 54 are in alignment and thus an electrical connection results without attachment or detachment of a wire by a vehicle seat installer.

The connector assembly 20 of the present arrangement thus provides a passive, inductive, and wireless approach to the detection of the presence or removal of a vehicle seat from a vehicle and to the detection of the buckled or unbuckled status of a vehicle seat belt buckle 30.

In operation, the vehicle seat belt buckle monitor module 100 communicates via a first coil cable 110 with an electronic control unit. Further, the vehicle seat belt buckle monitor module 100 provides electricity to two wires of the second coil cable 112. Typically alternating current is provided via the second coil cable 112 to the second connector 54 and through the interior thereof to connect with ends of the inductive coil 64 of the second connector 54. As shown in FIG. 2, when a vehicle seat is mounted in a vehicle, the first inductive coil 64 of the first connector 52 is adjacent and almost in contact with the second inductive coil 64 of second connector 54. Thus, power from the second inductive coil 64 of the second connector 54 is transmitted wirelessly to the first inductive coil 64. The third coil cable 114 provides the current to the inductive printed circuit coil 44 disposed on a printed circuit board 42. In one embodiment, the printed circuit board 42 is stationary. In operation, when the vehicle seat belt buckle 30 is secured, the screen/shield 46 shown in FIG. 10 surrounds the printed circuit board 42 having the inductive printed circuit coil 44. Such condition results in a concentration or increase or change in the amplitude of the magnetic field generated by the inductive printed circuit coil 44 that is formed on the printed circuit board 42 which results in a change in the impedance, phase, and amplitude of the inductive connector circuit signal transmitted successively through the coil cable 114, the connector sections 52 and 54, the coil cable 112 and into the vehicle seat belt buckle monitor module 100 to allow for the generation of visual, audible, or other signals. Further, the signals can be provided to an electronic control unit via the first coil cable 110.

In one arrangement, a bench seat from a van is removable without unplugging and connector wire. Moreover, the vehicle seat belt buckle 30 is free from a battery to power a sensor or the inductive printed circuit coil 44.

Numerous variations and modifications of the embodiment of the vehicle seat connector assembly 20 in accordance with the present arrangement may be effected without departing from the spirit and scope of the novel features of the arrangement. It is to be understood that no limitations with respect to the embodiment illustrated herein are intended or should be inferred. It is, of course, intended to cover by the appended claims all such modifications as fall within the scope of the claims.

What is claimed is:

1. A vehicle seat connector assembly comprising:
   a first connector coupled to a seat of a vehicle and including a first inductive coil; and
   a second connector coupled to the vehicle and including a second inductive coil, the first and second connectors being positioned relative to each other in a first relationship with the first and second connectors coupled to each other and the first and second inductive coils positioned opposite each other to define a closed inductive coil circuit and a second relationship with the first and second connectors and the first and second inductive coils separated from each other to define an open inductive coil circuit.

2. The vehicle seat connector assembly of claim 1 further comprising:
   a third inductive coil on a vehicle seat belt buckle; and
   a cable extending between the first inductive coil of the first connector and the third inductive coil.

3. The vehicle seat connector assembly of claim 2, wherein the third inductive coil is a printed circuit coil disposed on a printed circuit board.

4. The vehicle seat connector assembly of claim 2, wherein the seat of the vehicle that the first connector is coupled to is a removable seat of the vehicle, and wherein the vehicle seat belt buckle is free from a battery.

5. The vehicle seat connector assembly of claim 2 further comprising a shield on the vehicle seat belt buckle, the third inductive coil and the shield being movable relative to each other into a relationship wherein the shield either covers or is retracted from the third inductive coil.

6. The vehicle seat connector assembly of claim 5, wherein the third inductive coil is stationary within the vehicle seat belt buckle, and wherein the shield surrounds the third inductive coil when the vehicle seat belt buckle is engaged.

7. The vehicle seat connector assembly of claim 2 further comprising a vehicle seat/belt buckle monitor module and another cable extending between the vehicle seat/belt buckle monitor module and the second inductive coil of the second connector.

8. The vehicle seat connector assembly of claim 1 wherein each of the first and second connectors includes a housing defining an interior for a foot, a coil spring, a pusher, and the first and second inductive coils respectively.

9. The vehicle seat connector assembly of claim 8 wherein the respective first and second inductive coils are seated against the respective pusher, the coil spring exerts a compressive force against the first inductive coil, the foot is secured to the housing, and a cable extends through the foot.

10. The vehicle seat connector assembly of claim 8 wherein the foot includes a plurality of clips for securing the foot to the housing.

11. The vehicle seat connector assembly of claim 1 wherein each of the first and second inductive coils include respective ends wound on respective first and second coil bases.

12. The vehicle seat connector assembly of claim 1, wherein the first and second inductive coils are printed circuit coils.

13. A vehicle seat connector assembly comprising:
    a first connector coupled to a seat of a vehicle and including a first inductive coil;
    a second connector coupled to the vehicle and including a second inductive coil, the first and second connectors being positioned relative to each other in a first relationship with the first and second connectors coupled to each other and the first and second inductive coils positioned opposite each other to define a closed inductive coil circuit;
    a third inductive coil disposed on a vehicle seat belt buckle; and
    a cable extending between the first inductive coil of the first connector and the third inductive coil.

14. The vehicle seat connector assembly of claim 13 further comprising a shield disposed on the vehicle seat belt buckle, the third inductive coil and the shield being movable relative to each other into a relationship wherein the shield either covers or is retracted from the third inductive coil.

15. The vehicle seat connector assembly of claim 14 further comprising a vehicle seat/belt buckle monitor module and another cable extending between the vehicle seat/belt buckle monitor module and the second inductive coil of the second connector.

16. The vehicle seat connector assembly of claim 15 wherein each of the first and second connectors includes a housing defining an interior for a foot, a coil spring, a pusher, and the first and second inductive coils respectively.

17. The vehicle seat connector assembly of claim 16 wherein the respective first and second inductive coils are seated against the respective pushers, the coil spring exerts a compressive force against the first inductive coil, the foot is secured to the housing, and the cable extends through the foot.

18. The vehicle seat connector assembly of claim 13, wherein the first and second inductive coils are printed circuit coils.

19. The vehicle seat connector assembly of claim 18, wherein the third inductive coil is a printed circuit coil, and wherein a second relationship with the first and second connectors occurs when the first and second inductive coils separated from each other when a removable vehicle seat is removed to define an open inductive coil circuit.

20. The vehicle seat connector assembly of claim 13, wherein the third inductive coil is stationary within the vehicle seat belt buckle, wherein the shield includes a central open sleeve that receives the third inductive coil when the vehicle seat belt buckle is engaged, and wherein the seat of the vehicle that the first connector is coupled to is a removable seat of the vehicle.

* * * * *